(No Model.)
C. L. HARTSHORN.
TWIST DRILL.
No. 262,588. Patented Aug. 15, 1882.
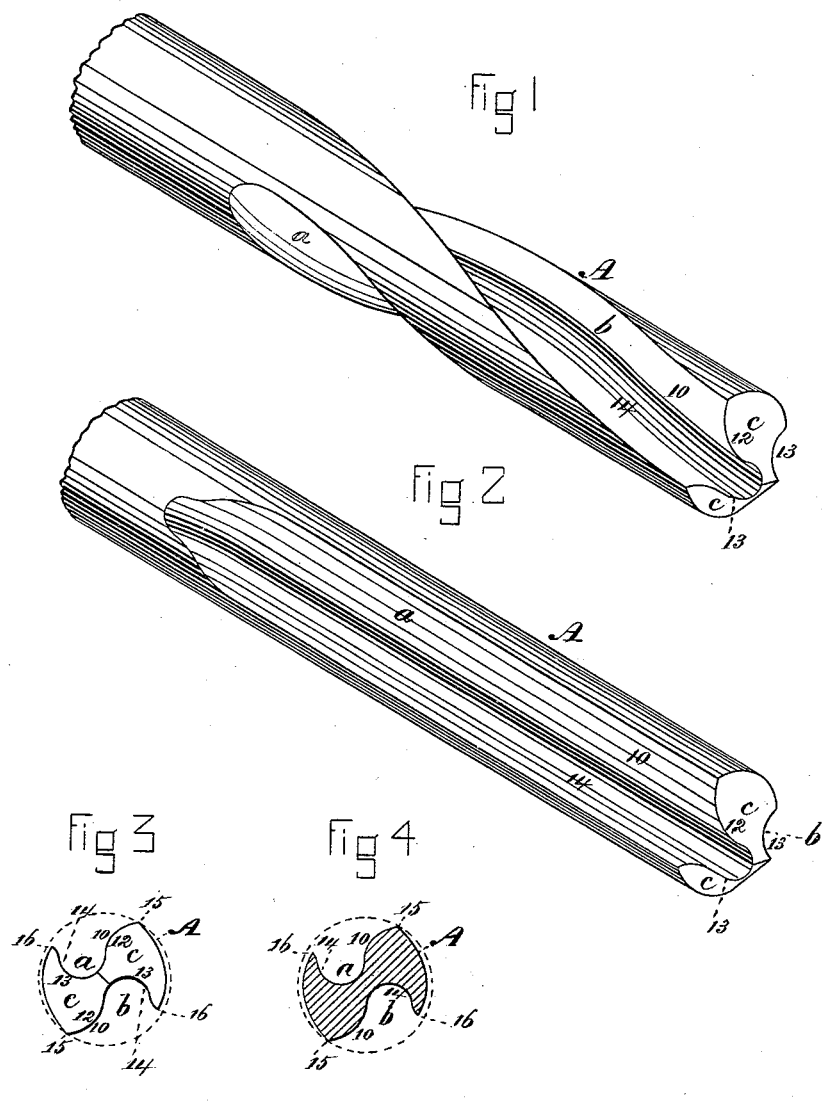
WITNESSES
N. J. Cambridge
Chas. E. Griffin
INVENTOR
Calvin L. Hartshorn
per F. E. Teschemacher
Atty

UNITED STATES PATENT OFFICE.

CALVIN L. HARTSHORN, OF WORCESTER, ASSIGNOR TO THEODORE P. FARMER, OF BOSTON, MASSACHUSETTS.

TWIST-DRILL.

SPECIFICATION forming part of Letters Patent No. 262,588, dated August 15, 1882.

Application filed May 19, 1882. (No model.)

*To all whom it may concern:*

Be it known that I, CALVIN L. HARTSHORN, a citizen of the United States, residing at Worcester, in the county of Worcester and State of Massachusetts, have invented an Improvement in Twist and Fluted Drills for Boring Metal, of which the following is a full, clear, and exact description, reference being had to the accompanying drawings, making part of this specification, in which—

Figure 1 is a perspective view of a twist-drill made in accordance with my invention. Fig. 2 is a perspective view of a fluted drill made in accordance with my invention. Fig. 3 is a plan of the point of one of my improved drills. Fig. 4 is a transverse section through one of my improved drills.

Twist and fluted drills for boring metal, as heretofore made, have been provided with either concave or straight cutting edges or lips. The concave edge is objectionable for the reason that it makes a gathering or dragging cut, thereby increasing the resistance and the consequent amount of power required to operate the drill, while the straight cutting edge or lip, although it overcomes many of the difficulties incident to the concave lip, is nevertheless also objectionable, for the reason that it cuts at the same time squarely along its entire length, or in a line parallel with the radius of the drill, thus also offering much resistance, while in both cases the drill is subjected to a considerable strain, which greatly increases the liability of breakage.

My invention has for its object to overcome the above-mentioned difficulties and to reduce the resistance to the rotation of the drill to a minimum; and my invention consists in a twist or fluted drill provided with two correspondingly-shaped grooves situated opposite to each other, the side of each groove which makes the cutting-edge being of convex curvature along its entire length, so that when the end of the drill is ground away to form the point a lip or cutting-edge of convex form or curvature will be produced, the opposite side of the groove being of concave curvature to form a clearance for the discharge of the chips, by which construction the cutting-edge or lip is caused to act as a shear, cutting the metal being bored from the center of the drill outward toward the periphery, and thus materially reducing the resistance, as the cutting-edge slices the metal instead of scraping it, as is the case with all other drills having straight or concave lips or cutting-edges.

In the said drawings, A represents the drill, which is provided with two correspondingly-shaped grooves, *a b*, situated opposite to each other or on opposite sides of the stock, these grooves being produced by milling or in any other suitable manner. The side 10 of each of the grooves *a b*, which forms the cutting-edge, is of convex curvature along its entire length, as seen in Figs. 1 and 2, so that when the end of the stock of the drill is ground away on each side to form the point, leaving the rounded faces *c c*, two lips or cutting-edges, 12 12, of convex form or curvature will be produced, which project beyond the curved edges 13 13 so as to come into contact with and cut the metal to be bored, each groove having the highest point of the convexity of the side 10 preferably a little nearer to the axis or center of the drill than to the periphery thereof. The opposite side, 14, of each groove opposite to the side 10 is of concave curvature, to produce the necessary clearance or space for the accommodation and discharge of the chips as they ascend from the cutting point.

In operating a drill made as above described the convex lips or cutting-edges 12 will act as shears, cutting or slicing the metal being bored from the center of the drill outward toward the circumference, instead of scraping it, as heretofore, whereby the resistance offered to the rotation of the drill is reduced to a minimum, the power required to operate it proportionately diminished, and the strain and consequent liability of breakage avoided, much better results being thus produced than it has heretofore been possible to secure. Furthermore, the convex form of the cutting-edges 12 12 causes them to act upon the metal being bored in such a manner as to avoid the tendency of the drill to be drawn inward, as frequently occurs with an ordinary twist-drill by reason of the sharp or hook-shaped corners of the cutting-edges of the latter catching the metal being bored and acting as a screw to draw the drill farther into the hole.

Each side of the drill-stock is cut away throughout its entire length from the edge 15 of one groove to the nearest edge, 16, of the other groove, as seen in Figs. 3 and 4, to form the usual "relief," and cause the edge 15 only of each groove to come into contact with the sides of the hole being bored.

My improvement may be applied either to a drill having spiral grooves, as shown in Fig. 1, or to one provided with straight longitudinal grooves, as seen in Fig. 2. The grooves in all cases having one side made with a convex curvature to produce a convex cutting-edge or lip, which is the essential feature of my invention.

What I claim as my invention, and desire to secure by Letters Patent, is—

A twist or fluted drill provided on opposite sides of its stock with two correspondingly-shaped grooves, $a\ b$, and having the side 10 of each groove which forms the cutting-edge or lip of convex curvature along its entire length, so that when the end of the drill is ground away to form the point lips or cutting-edges 12 of convex form or curvature will be produced, the opposite side, 14, of each groove being of concave curvature to form a clearance for the discharge of the chips, all substantially as and for the purpose set forth.

Witness my hand this 12th day of May, A. D. 1882.

CALVIN L. HARTSHORN.

In presence of—
P. E. TESCHEMACHER,
W. J. CAMBRIDGE.